April 7, 1925.
L. W. BUGBEE, JR
1,532,880
MIRRORED LENS PROTRACTOR
Filed June 7, 1924
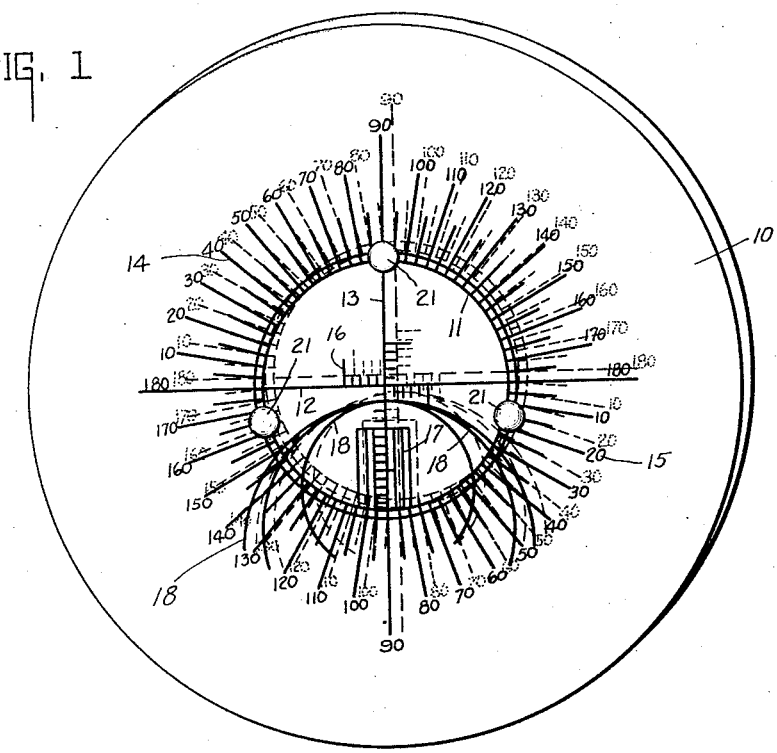
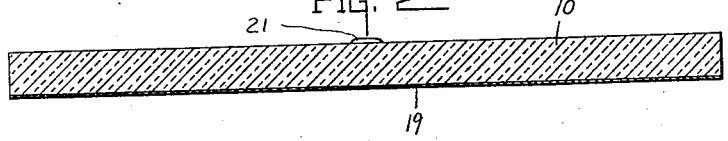
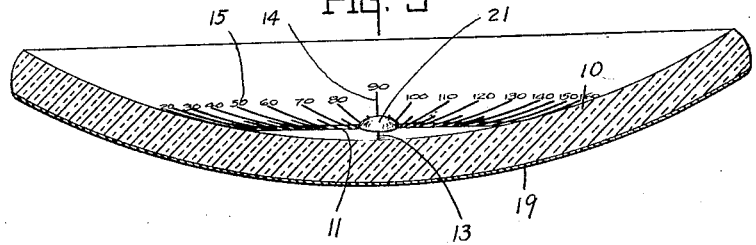
INVENTOR.
LUCIAN W. BUGBEE, JR.
BY
*[signature]*
ATTORNEYS.

Patented Apr. 7, 1925.

1,532,880

UNITED STATES PATENT OFFICE.

LUCIAN W. BUGBEE, JR., OF INDIANAPOLIS, INDIANA, ASSIGNOR TO ONEPIECE BIFOCAL LENS COMPANY, OF INDIANAPOLIS, INDIANA, A CORPORATION.

MIRRORED LENS PROTRACTOR.

Application filed June 7, 1924. Serial No. 718,499.

*To all whom it may concern:*

Be it known that I, LUCIAN W. BUG-BEE, Jr., a citizen of the United States, and a resident of Indianapolis, county of Marion and State of Indiana, have invented a certain new and useful Mirrored Lens Protractor; and I do hereby declare that the following is a full, clear, and exact description thereof, reference being had to the accompanying drawings, in which like numerals refer to like parts.

The object of this invention is to provide a protractor for lens blanks and finished lenses which will avoid the errors of protractors heretofore in use whenever the inspection is not absolutely perpendicular or radial to the protractor, by insuring the inspector using the same that his inspection is exactly perpendicular or radial to the protractor and the lens or blank thereon. Such protractor is used for laying out lens blanks and properly marking the same preparatory to grinding, finishing or other further treatment and for inspecting finished lenses and their mounting.

This invention is also of particular value in connection with the inspection of bifocal lenses or lens blanks for centering and decentering the same and locating the meridians of the lenses or blanks for aiding in the scientific finishing of the prescription side of a onepiece bifocal lens, or for edging and otherwise forming the lenses for their accurate mounting in the spectacle frame.

The chief feature of the invention consists in employing a mirror in making the protractor, that is, a plate of glass or other transparent material with the protractor lines and numerals thereof on the one surface and the other surface covered with reflecting material to form a mirror. In using this sort of protractor, it is adjusted with reference to the eyes of the inspector so that the protractor lines and numerals on the upper surface of the glass will coincide exactly with their reflection or images caused by the mirror so that the latter will not be apparent along his line of vision. In that position and condition of the protractor and inspector, his line of vision will be exactly and necessarily perpendicular with the reflector and the lens or blank thereon.

In using the ordinary protractor made of paper or other opaque material, or in using a naked glass protractor, there is considerable difficulty in adjusting the same with reference to the eyes of the inspector in order that his lines of vision will be exactly perpendicular to the protractor and thus enable him to accurately locate the lens thereon, particularly if it be a bifocal lens. This present invention is to obviate this difficulty which is a condition known in the art as an error due to "parallax."

The full nature of the invention will be understood from the accompanying drawings and the following description and claims:

In the drawings, Figure 1 is a perspective view of the mirrored protractor, the reflected images of the protractor lines being indicated by dotted lines. Fig. 2 is a central cross section of a flat mirrored protractor. Fig. 3 is a similar section of a concavo convex mirrored protractor.

This protractor is a plate or disk 10 made of glass or other transparent material. Upon the one side thereof lines and numerals are placed, the same as in paper chart protractors heretofore used. The chart herein shown has a circle 11 concentric of the disk 10 and two primary meridian lines 12 and 13 traversing the same. From the circle radiating lines 14 are indicated representing various degrees of a circle and these degrees are indicated by the numerals 15, so that each end of the meridian or line 12 is marked "180" and each end of the meridian line 13 is marked "90." On the meridian lines there are indicated millimeter scales as is well known in the art and which need not be described particularly herein. There are also three curved lines 18 shown, being parts of circles of different curvatures tangential with each other and located in the lower half of the circle 11 for the purposes of properly locating bifocal lenses or lens blanks on said protractor. The lens, not shown, so placed on the protractor with the division line between the bifocal surfaces thereof will coincide with one of the lines 18 on the protractor. Then the positions of the parts of the lens are indicated and located relative thereto as is well known in the art.

As shown in Fig. 2, the glass protractor plate is coated on the lower or other side by a coating 19 of reflecting material, such as is employed in making mirrors.

In Fig. 3 there is shown a concavo-convex protractor in the form of a segment or a hollow sphere which is a more desirable form for many purposes than the flat protractor shown in Fig. 2. The curvature of the concavo-convex protractor is and should be preferably concentric with the eye of the observer while testing lenses, preferably with a radius of about seven inches.

With the flat protractor mirror when the line of vision is through the center, shadows of the other lines, at least the outlying lines, will be observable. Fig. 1 shows said shadow lines as viewed from a point at the upper right hand. With the concavo-convex mirror protractor when the line of vision is through the center, there will be no shadow lines visible, which makes it less confusing and more safe and accurate when in use.

In using such mirror protractor, the lens blank or lens is placed upon the protractor so as to register with the circle 11 and principal meridian lines; and when viewed from the perpendicular, such lens will be correctly placed when no shadow line is apparent in the line of vision. In the concavo-convex form when thus placed, no shadow line will be apparent. If the shadow line is apparent in the line of vision, it is evidence that the lens is not correctly placed or marked. This makes an easily observable test, developing absolute accuracy in the use of the protractor.

In order to conveniently support the lens or lens blank to keep the lens from injuring the markings on the protractor, three small buttons 21 are secured thereon properly equidistant from each other and from the center. So far as this particular invention is concerned, it is immaterial how the mirror is made or what sort of chart is indicated thereon, the novel feature being a protractor made on or by use of a mirror.

The principle of this protractor is not limited to use in laying out blanks and marking lenses, but is adapted for any use in connection with the optical business where such protractor is serviceable such as taking frame measurements with the lenses in the frame and like uses.

The invention claimed is:

1. A protractor for optical purposes including a transparent plate, an inwardly reflecting coating on one surface thereof, and protractor markings on the other surface thereof.

2. A protractor for laying out and inspecting lens blanks, lenses and the like including a transparent plate concavo-convex in form, an inwardly reflecting coating on the convex surface thereof, and protractor markings on the concave surface thereof.

In witness whereof, I have hereunto affixed my signature.

LUCIAN W. BUGBEE, Jr.